US007412527B2

(12) United States Patent
Pulver et al.

(10) Patent No.: US 7,412,527 B2
(45) Date of Patent: Aug. 12, 2008

(54) SYSTEMS AND METHODS FOR ADVANCED COMMUNICATIONS AND CONTROL

(75) Inventors: Jeffrey L. Pulver, Great Neck, NY (US); Carl S. Ford, Fairlawn, NJ (US); Edward T. Guy, III, Chatham, NJ (US); James E. Toga, Wayland, MA (US)

(73) Assignee: Pulver.com, Melville, NY (US)

( * ) Notice: Subject to any disclaimer, the term of this patent is extended or adjusted under 35 U.S.C. 154(b) by 0 days.

(21) Appl. No.: 11/248,170

(22) Filed: Oct. 13, 2005

(65) Prior Publication Data
US 2006/0190543 A1    Aug. 24, 2006

Related U.S. Application Data (60) Provisional application No. 60/617,664, filed on Oct. 13, 2004.

(51) Int. Cl.
*G06F 13/00* (2006.01)
(52) U.S. Cl. .................. 709/229; 709/206; 709/219
(58) Field of Classification Search ................ 709/206, 709/217, 219, 223, 225, 250, 229; 719/328, 719/329
See application file for complete search history.

(56) References Cited

U.S. PATENT DOCUMENTS

| 6,175,619 | B1 * | 1/2001 | DeSimone | 379/202.01 |
|---|---|---|---|---|
| 6,677,976 | B2 * | 1/2004 | Parker et al. | 348/14.08 |
| 6,707,811 | B2 * | 3/2004 | Greenberg et al. | 370/352 |
| 7,016,978 | B2 * | 3/2006 | Malik et al. | 709/246 |
| 7,039,040 | B1 * | 5/2006 | Burg | 370/352 |
| 7,085,258 | B2 * | 8/2006 | Creamer et al. | 370/352 |
| 2002/0046299 | A1 * | 4/2002 | Lefeber et al. | 709/318 |
| 2002/0101446 | A1 * | 8/2002 | Tang et al. | 345/751 |
| 2003/0126207 | A1 * | 7/2003 | Creamer et al. | 709/204 |
| 2004/0083267 | A1 * | 4/2004 | Thompson | 709/206 |
| 2005/0091694 | A1 * | 4/2005 | Rambo | 725/110 |
| 2005/0235219 | A1 * | 10/2005 | Szeto | 715/788 |

\* cited by examiner

*Primary Examiner*—Viet Vu
(74) *Attorney, Agent, or Firm*—Pillsbury Winthrop Shaw Pittman, LLP (57) ABSTRACT

Methods and systems for telecommunications operations and controls include (1) an enhanced text message process or methodology that allows a remote user who does not have, already installed, a specialized voice telephony program to nevertheless place and participate in a voice call, (2) call admission control using a "degrees of separation" metric, (3) real time controlled sharing of contact (buddy) lists, (4) multi-service instance messaging conferences, and (5) "meta buddies" or buddy lists that can be automatically imported and made part of a user's own buddy list.

13 Claims, 8 Drawing Sheets

SYSTEMS AND METHODS FOR ADVANCED COMMUNICATIONS AND CONTROL

This application claims the benefit of U.S. Provisional Application No. 60/617,664, filed Oct. 13, 2004, which is herein incorporated by reference in its entirety.

BACKGROUND

1. Field of the Invention

Embodiments of the present invention relate generally to telecommunication operations and controls, and in particular, to methods and systems for providing telecommunication services over the internet.

2. Background of the Invention

The services provided by internet service providers have undergone explosive growth over the past several years. One such service has been the Instant Message or Instant Messaging (IM) service, which allows users to seamlessly exchange text messages on a substantial real-time basis. Indeed, it has been precisely because of the "real-timeness" of the exchange that has made IM particularly popular.

A typical IM implementation only supports text messaging. However, there are times when voice-to-voice communication may be more appropriate or desirable. However, a voice-enabled communication device may not be readily available. In addition, the parties may not necessarily be aware of one another's telephone numbers to initiate a conventional telephone conversation.

Another common limitation regarding a typical IM implementation is that users must be enrolled with a common internet service provider to be engaged in a multi-user text conference (also known as a "chat session", which is implemented as a "chat room"). That is, only those users who are members of a given IM text network are able to receive instant messages from other users in the same network.

In addition, with currently available IM internet services, a user typically must include, a priori, a party's address in his/her "buddy" list prior to being able to send an IM to that party. Thus, in the event the user wishes to conduct a multi-party conference with that party and a third party, the user must first invite the third party to register with his/her IM service and then add the third party to his/her buddy list before conducting the conference. This process is, of course, inconvenient and time-consuming, and may not even be practicable.

As will be appreciated by those skilled in the relevant art, conventional IM, despite its widespread use, still inherently embodies several inconvenient limitations.

BRIEF SUMMARY OF THE INVENTION

It is an object the several embodiments of the present invention to address the foregoing inconvenient limitations and to provide improved IM features and functionality.

More specifically, embodiments of the present invention are directed to (1) an enhanced text message process or methodology that allows a remote user who does not have, already installed, a specialized voice telephony program to nevertheless place and participate in a voice call, (2) call admission control using a "degrees of separation" metric, (3) real time controlled sharing of contact (buddy) lists, (4) multi-service instance messaging conferences, and (5) "meta buddies" or buddy lists that can be automatically imported and made part of a user's own buddy list.

According to a first embodiment of the present invention, there is provided a method for providing telecommunication services by engaging in an IM session in which it is desirable to establish a voice connection, sending a hyperlink, via IM, from one party to another party, wherein the hyperlink is associated with an integrated telephone web browser application, and thereafter connecting the parties via an internet voice call (e.g., using VoIP).

According to a second embodiment of the present invention, there is provided a method for call/session admittance control that comprises establishing a buddy list including at least one contact, and establishing a "degrees of separation" metric for the at least one contact. In this embodiment, the degrees of separation metric defines a maximum number of buddy list traversals from which their communications device will alert the user. The degrees of separation metric may be calculated by:

degree of separation=
$SUM_{i=(0\,\ldots\,n-1)\,nodes\,in\,shortest\_path}$ (Weight$_i$).

According to a third embodiment of the present invention, there is provided a method for sharing buddy lists between IM system users by establishing a buddy list including at least one contact, and setting up a "shared" instruction that is incorporated in the buddy list. When a calling party's buddy list is set as "shared", a universal internet server may automatically add the buddy list to the calling party's buddy list.

A fourth embodiment of the present invention provides a method for implementing heterogeneous IM conferences. The method comprises establishing a buddy list including at least one contact, registering at a universal internet server, initiating an IM request to the at least one contact through the universal internet server, wherein the at least one contact is using a second internet server, delivering the IM request to the at least one contact by the universal internet server without switching the first internet server to the second internet server, and receiving an IM response from the at least one contact through the universal internet. The universal internet server might be viewed as an IM aggregator, proxy server or intermediary that permits IM users operating from different networks to participate in a common chat session.

A fifth embodiment of the present invention provides a method for combining contacts (or buddy lists) from disparate messaging networks. The method comprises logging-in to a universal internet server which scans the buddy list of the user, retrieving a buddy list of at least one of the buddies in the user's buddy list, and automatically adding at least one contact of the buddy list of the at least one of the buddies in the user's buddy list.

These and other features of the present invention, and their attendant advantages, will be more fully appreciated upon a review of the following detailed description in conjunction the several associated drawings.

DETAILED DESCRIPTION OF EMBODIMENTS OF THE INVENTION

The present invention provides methods and systems for improved IM service between a plurality of internet/IM users. As will be appreciated by those skilled in the relevant art, several of the embodiments of the present invention rely on an IM intermediary that permits IM users to communicate with one another even though the users are logged on to different networks. Other embodiments of the present invention provide enhanced features to conventional IM. The first embodiment discussed immediately below is one example of one such enhanced feature.

Text to Voice

Figure 1:
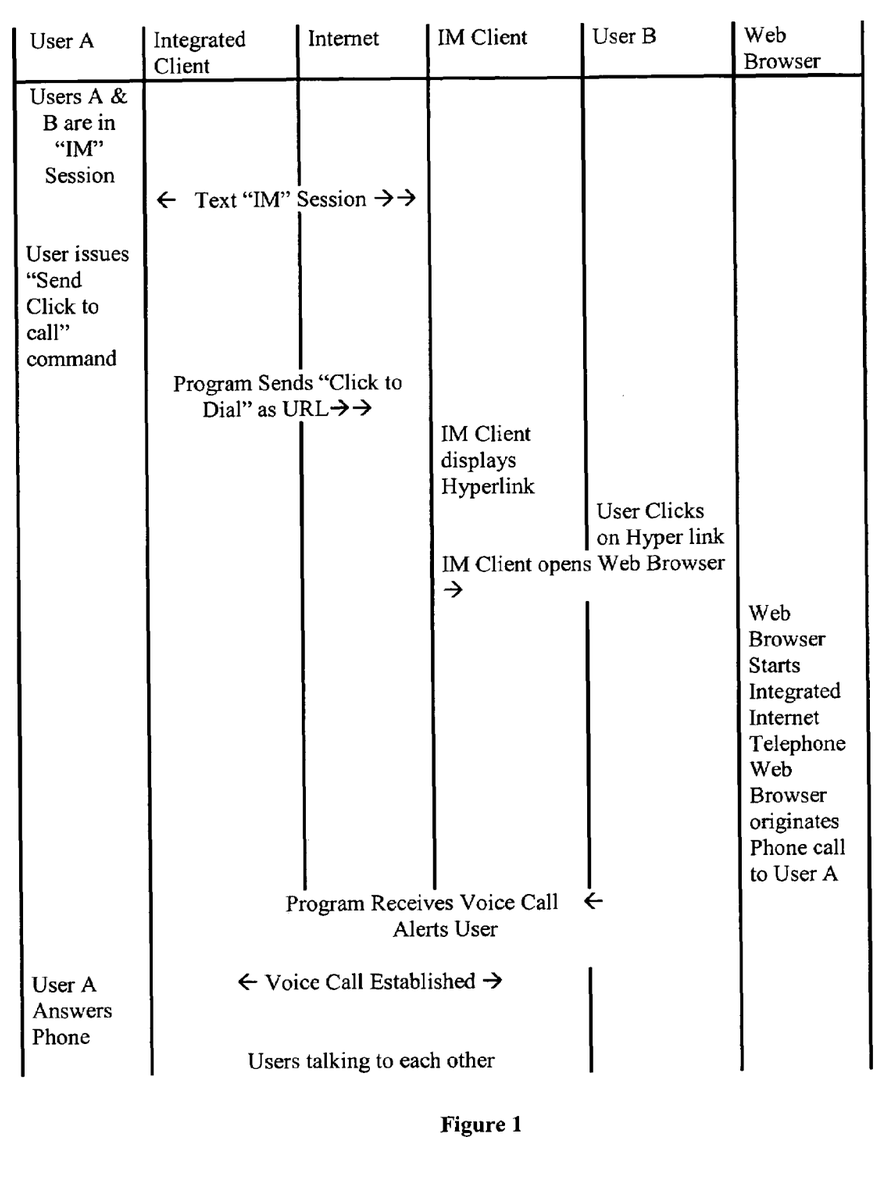
FIG. 1 is an exemplary sequence diagram showing a possible message exchange between a user A and a user B in accordance with embodiments of the present invention.

FIG. 1 depicts an exemplary instant message exchange between two users A and B in accordance with an exemplary embodiment of the present invention. Here, Users A and B are initially involved in an instant messaging (IM) text-only session. As indicated, User A is employing an "integrated client," while User B is employing a conventional IM client application. An "integrated client" in accordance with embodiments of the present invention is one that combines not only conventional IM functionality, but also includes, as will be appreciated more fully below, a Voice over IP (VoIP) capability, as well as, perhaps, still other enhanced features, many of which are described herein.

At some point in the text-only communication between Users A and B, User A decides to initiate a voice connection with User B instead of, or in addition to, the text-only connection. To do so (and knowing that User B is not operating a similar integrated client), User A issues a "Send Click to Call" command to the integrated client, which, in turn, sends a "Click to Dial" URL (e.g., a hyperlink) to User B. The URL is then displayed on User B's communications device. Note that the term "communications device" may include devices that enable communications, including, but not limited to, a Softphone, video phone, or text program, computer, PDA, or the like, all of which are capable of accessing a, e.g. a web site by selecting hyperlinks. After receiving the "Click to Dial" URL, User B clicks on the sent URL, which causes a web browser (or similar program) to be opened on User B's communications device. The clicked on hyperlink/URL is preferably associated with (and thus the web browser launches) an integrated internet telephone web application that initiates a voice call to the integrated client application running on User A's communications device. User A is then alerted to an incoming call (i.e., a VoIP call) and notifies the integrated client o accept or answer the incoming call. Thereafter, a voice session is established and voice communications can proceed between Users A and B.

Several variations of the foregoing embodiment are possible and still considered to be within the scope of the present invention. For example, users may not be in an "IM" session, but can simply send the hyperlink through an IM system. Also, User A may answer the incoming call using an instrument other than an integrated client. For instance, the IM message that included the hyperlink might also include a regular telephone number of land line or mobile telephone.

In addition, the voice call may transport other audio information including human utterances, music, ambient sounds, etc. Still another possible embodiment is one in which the voice call may be directed to an automated agent, e.g., a voice mail system, or an automated directory.

Further, those skilled in the art will appreciate that the term "IM" as used herein refers to any system capable of passing text messages between remote users (or agents) where the messaging apparatus recognizes hyperlinks.

Thus, in summary, this first embodiment of the present invention comprises:
1) a method of sending (or "hURLing") an Internet hyperlink that invokes a voice call;
2) a program/apparatus that has the appropriate functionality to invoke said method; and
3) a web browser-based program that is used to initiate and maintain a voice call.

Degrees of Separation

In addition to conducting a voice call between internet users as described above, there is often the need to more intelligently control the voice, and video calls as well as the Text sessions (SMS and IM) in which users are asked to participate. In this regard, a second embodiment of the present invention, therefore, provides a "call admittance control method" that is based on "degrees of separation," or specifically, a measure of smallest number of 'buddy list' traversals between an originating and addressed parties. According to this embodiment of the present invention, each user may specify the maximum number of 'buddy list' traversals from which their communications device (phone, Softphone, video phone, or text program) will alert the user.

Figure 2:
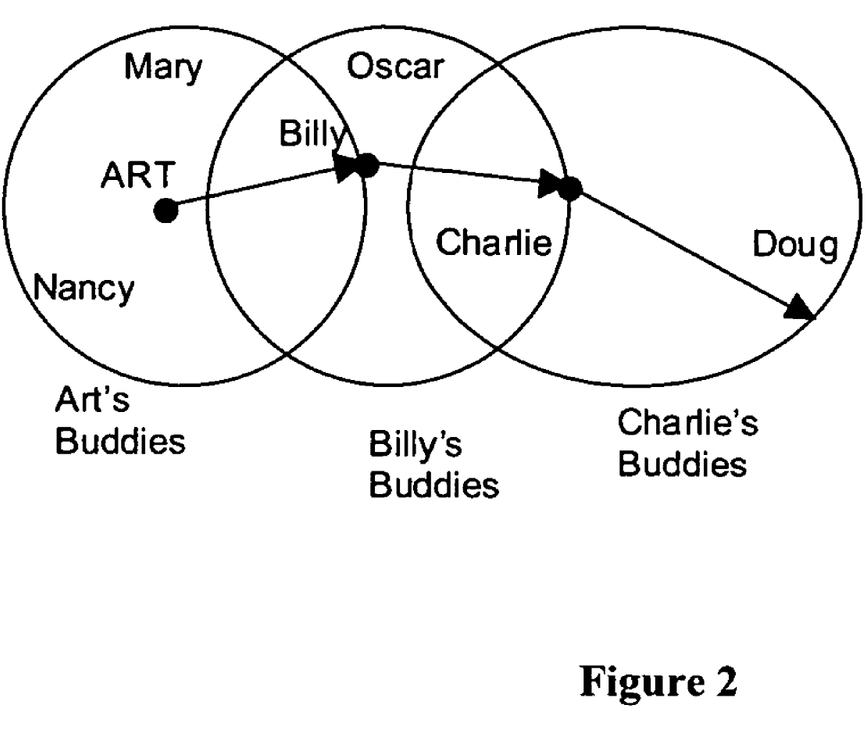
FIG. 2 is a diagram showing a relationship of buddy lists among several users.

Consider the following users and their corresponding contact or "Buddy Lists" in connection with further describing the features of this aspect of the present invention:

User Art
  Buddy Billy
  Buddy Mary
  Buddy Nancy
User Billy
  Buddy Charlie
  Buddy Oscar
User Charlie
  Buddy Doug
User Doug FIG. 2 illustrates the foregoing relationships graphically. If Doug has his "degrees of separation" metric set to 2, a session from Art will be rejected (Art→Billy, Billy→Charlie, Charlie→Doug; 1+1+1=3; 3>2). However, Billy and Charlie's calls will proceed to alert Doug (or receive whatever call treatment is appropriate for a new call at that time.) In a preferred implementation of this embodiment, Doug may change his degrees of separation metric to any value including one capable of receiving all calls.

Mathematically, this system may be modeled as a Graph where the users represent Nodes and the buddy/contact list represents Edges to the corresponding users' nodes. The "degrees of separation" metric represents the minimum distance between the calling and called parties (the shortest path). For each call where the called party subscribes to this feature, a metric is computed and compared to the called party's setting.

The metric may be computed as follows:

$$\text{Degrees of separation} = \text{SUM}_{i=(0\ldots n-1)\,nodes\,in\,shortest\_path}(\text{Weight}_i)$$

Determining the shortest weighted path may be accomplished by any method. $\text{Weight}_i$ represents the value assigned to the edge connecting nodes (i and i+1). In a simple application, this value is always '1', but it may be assigned a value by each user, or the value assigned to the last edge by the called party.

In the context of this aspect of the present invention, the terms Caller and Call apply to sessions consisting of voice, video, and text or any combination of the above where these media are exchanged between the users. The terms Calling and Called party refer to the originator of a call and the addressed party, respectively.

Furthermore, in accordance with a preferred implementation, addressing may be done numerically, by Screen name, or by actual name. Determining the address may be done by any method.

Users may also set up various criteria in managing their IM profiles. For example, a user can set up the number of hops, or whether the degrees of separation function is enabled at all (On/Off). The handling of a rejected call attempt can include busy signals, ringing forever, not reachable message, taking a message, automatically interrogating the caller (via, e.g., a challenge system), and so on.

Further, the Buddy Lists may be heterogeneous and be maintained on several different vendor systems (e.g., Art on America On Line (AOL), Billy on MSN, Charlie on Yahoo, and Doug on Free World Dialup (FWD)). The users may indicate different metrics for each user or groups on their buddy lists. Users may also have access to a "black list" function, i.e., the ability to reject specific callers, or callers via a certain user. For example, a user might consider Oscar to have many grouchy friends and, as such, does not want to talk to any of them.

To differentiate buddies in the buddy lists, users may also, in accordance with an aspect of the present invention, give different weights to buddies that may be used in computing the degrees of separation. The weights may be applied as assigned by each user in the path from caller to called party and the weight assigned by the called party may apply to every edge along the path from the calling party to the caller. In addition, the weight assigned may only apply to the final edge in the path. Different weights may also be applied for different media, e.g., text-IM, voice, video.

It should be noted that computational complexity of the degree of separation may be reduced by computing shortest un-weighted path (or paths) and then applying the various weights. Since computing the exact shortest path can be computationally intensive, the shortest distance may be calculated heuristically yielding an approximate answer.

Finally, in accordance with an aspect of the invention, call logs may be used for maintaining additional contact information.

Interactive Sharing of Buddy Lists

In accordance with still another embodiment of the present invention, IM system users may also share 'Buddy (contact) lists' on an interactive basis. Some voice, video and text-based communications systems employ a contact list for which the system may also maintain information regarding the remote users' availability or other status. This embodiment of the present invention allows users to indicate that they allow other users to view and possibly import their friend's buddy list into their own.

For purposes of explanation, consider the following users and their corresponding contact or Buddy Lists:
   User Art
     Buddy Billy
     Buddy Mary
     Buddy Nancy
   User Billy (Sharing Enabled)
     Buddy Charlie
     Buddy Oscar
   User Charlie (Sharing not enabled)
     Buddy Doug User Billy has enabled 'buddy list sharing' and user Charlie has not. Art may view Billy's buddy list and see that Charlie is a member of it. Art may also 'import' Billy's list into his own. However, attempts to import Charlie's list will be rejected. User Art's Buddy List will comprise the following entries after importation is completed.
   User Art
     Buddy Billy
     Buddy Mary
     Buddy Nancy
     Buddy Charlie
     Buddy Oscar This embodiment of the invention may be implemented either at the edge of a network (e.g., in the users' individual communications devices) or as a server-based function. In either case, the end user preferably has fine-grain control over the types, frequency and source of these communications.

Multiple variations of this embodiment are also possible. For instance, an automatic propagation of updates could be implemented whereby if Billy added another user after Art had imported the list, the addition would be automatically added to Art's list. Further, user's may also control permissions regarding being shared by other buddy lists, e.g. Charlie could have opted out so that Art would not have received his contact information when Art imported the list from Charlie.

The control over permissions may also include the implementation of an approval request before anyone gains access to status information. For example, Art may request Charlie's presence data (i.e., is whether Charlie is presently on-line, or whether Charlie is part of a given contact or Buddy list), but such presence data may not be provided unless Charlie first grants express permission.

While the foregoing Buddy List functions are typically more easily implemented if all Buddy Lists are maintained on a single, centralized server system, it is nevertheless possible to obtain the information necessary to implement the functionality described above by querying the servers of separate IM service providers (or even the individual communications devices of respective users serviced by different (or the same) IM service providers).

Heterogeneous IM Conferences

Another embodiment of the present invention provides a method and system for heterogeneous IM conferences. Many IM users have memberships with multiple Instant Messaging (IM) text networks. As a result, they also typically have multiple buddy lists and may end up in parallel 'chat sessions' with buddies on separate networks. Current IM Messaging systems only allow users of the same service to be engaged in a conversation or multi-user text conference (also known as a "Chat Room"). To allow users to communicate with their buddy who uses different internet provider services, one preferred embodiment of the present invention permits users of disparate systems to communicate with each other regardless of the system to which they are connected, i.e., heterogeneous conferences.

Consider the following example:
   User Art (AOL, MSN, and Yahoo user)
     Buddy Billy (AOL)
     Buddy Mary (MSN)
     Buddy Nancy (Yahoo)

Figure 3:
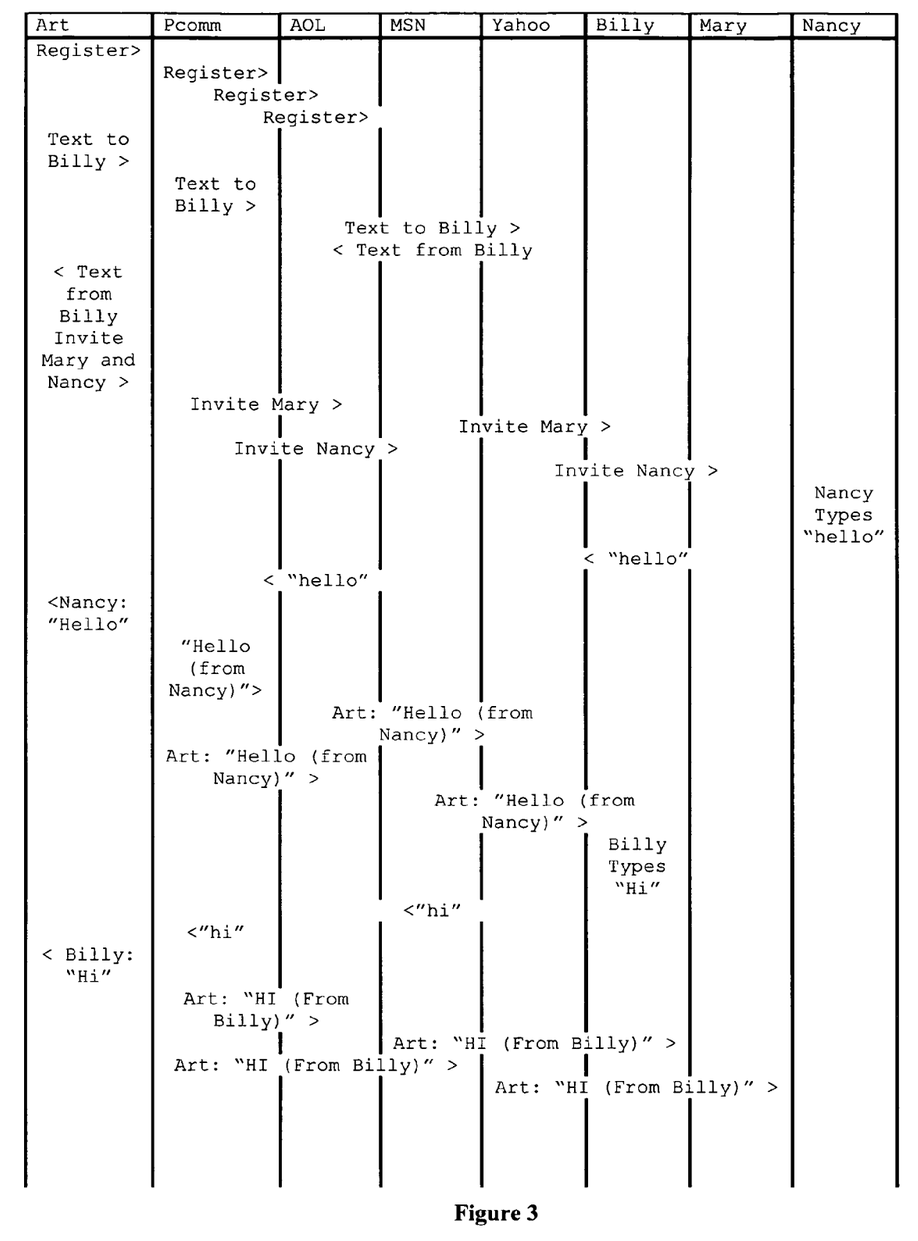
FIG. 3 is a sequence diagram showing heterogeneous IM chat room flow in accordance with embodiments of the present invention.

Art may start a 'chat' session with Billy on AOL, and then invite Mary and Nancy to the same conference room. For this to happen in accordance with this embodiment of the invention, the invitation messages are first relayed by an intermediary apparatus or server (shown as "pComm" in the figures) and, in turn, delivered to Mary and Nancy using Art's account for their service information. FIG. 3 shows an exemplary sequence diagram in accordance with this embodiment of the present invention in which all messages from all users will appear on each user's screen.

As mentioned, the methodology comprises relaying each text message to all the other users of the other services using Art's accounts for identity. Each message may indicate the original source of the message. If there are multiple members of the same service, conferencing facilities of that same service are preferably used and the messages sent by a user on this service do not need to be relayed by the pComm server to other users of the same service (but, they still need to be relayed to users using the other services.)

The pComm server, shown in FIGS. 4-9 and which is preferably implemented as an intermediary or proxy server, implements the processing steps to achieve the desired conference. FIGS. 4-9 illustrate this process and assume that Billy, Mary and Nancy are already logged-in (or registered) with their respective services.

Figure 4:
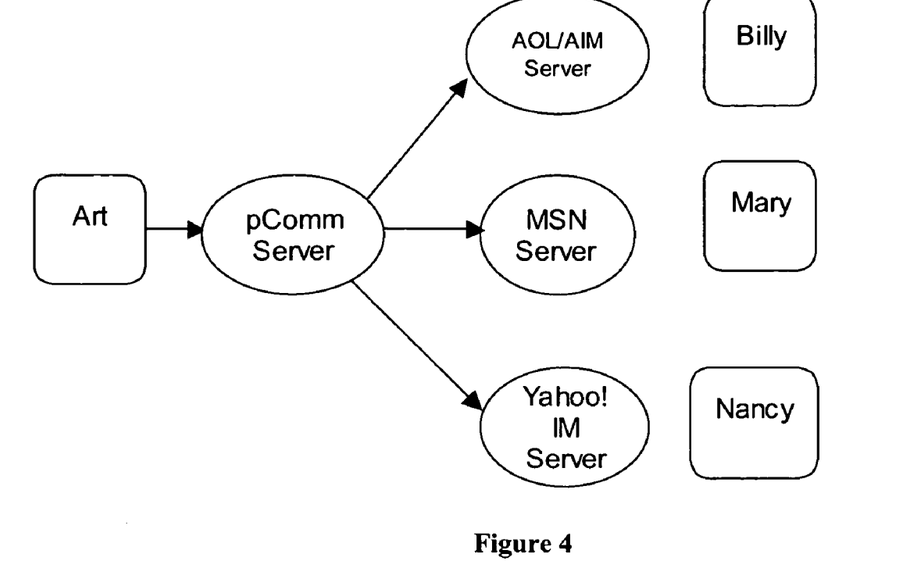
FIGS. 4-9 are diagrams showing an exemplary process for orienting several users into a conference service in accordance with embodiments of the present invention.
Figure 5:
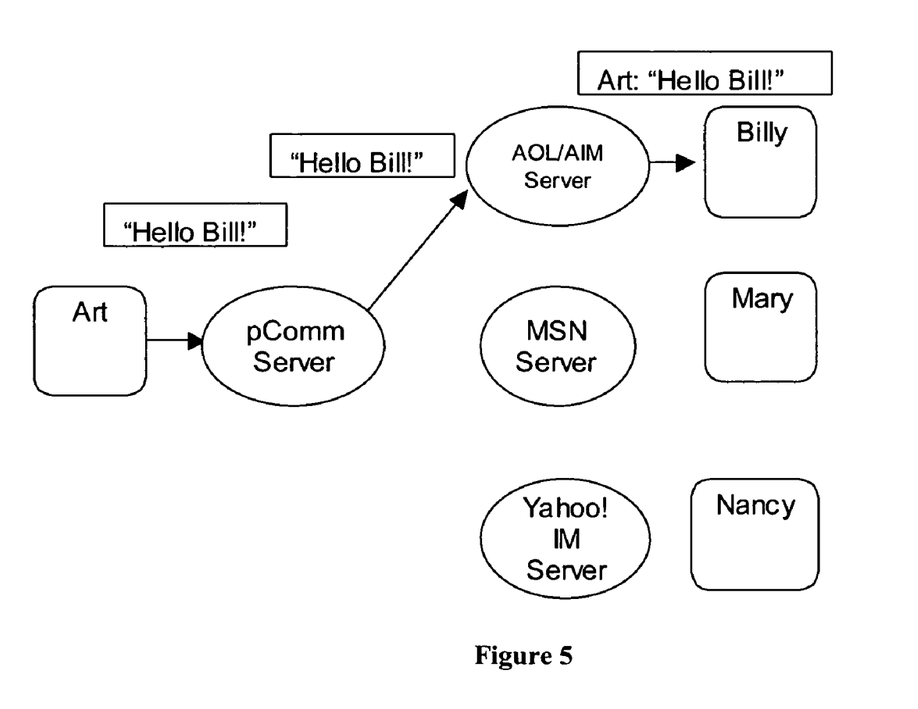
Figure 6:
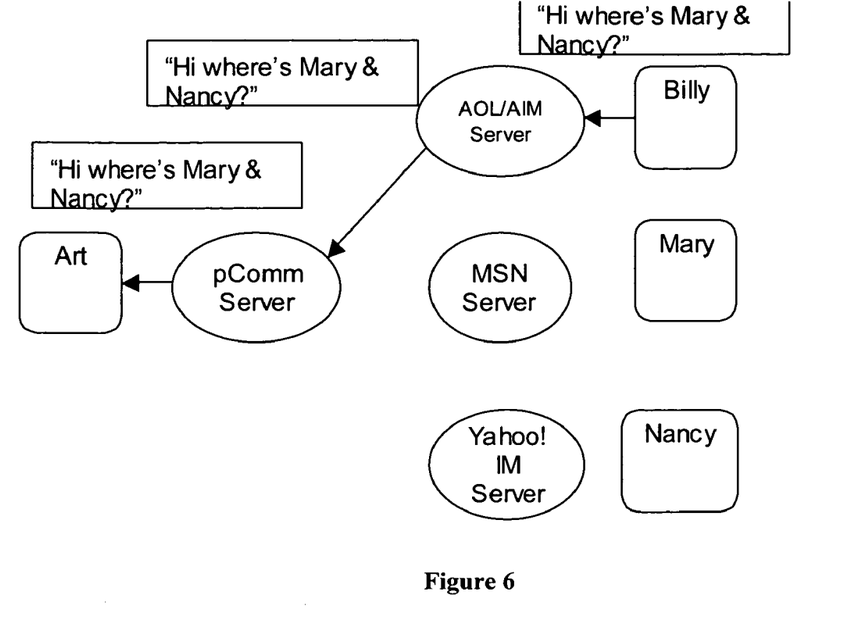

To begin the process, as shown in FIG. 4, Art registers with the pComm server, and the pComm server then registers Art on his behalf to each of AOL (for Billy), MSN (for Mary) and Yahoo (for Nancy). As a result, as shown in FIGS. 5 and 6, when Art sends a message to Billy, the pComm server delivers his message to Billy via AOL, as Billy is an AOL user. Billy can likewise respond to Art's message through the pComm server, which is, again, acting as an intermediary that is capable of communicating with the AOL (and other IM providing networks).

Figure 7:
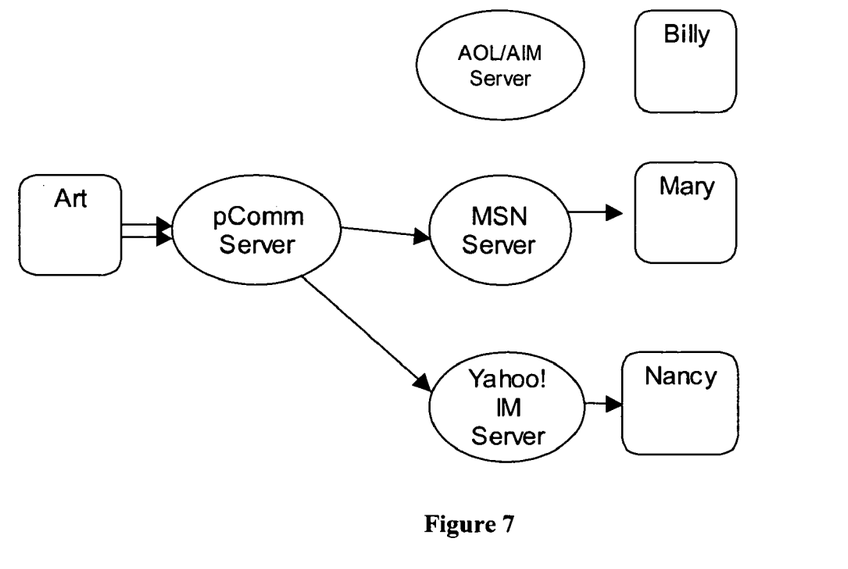
Figure 8:
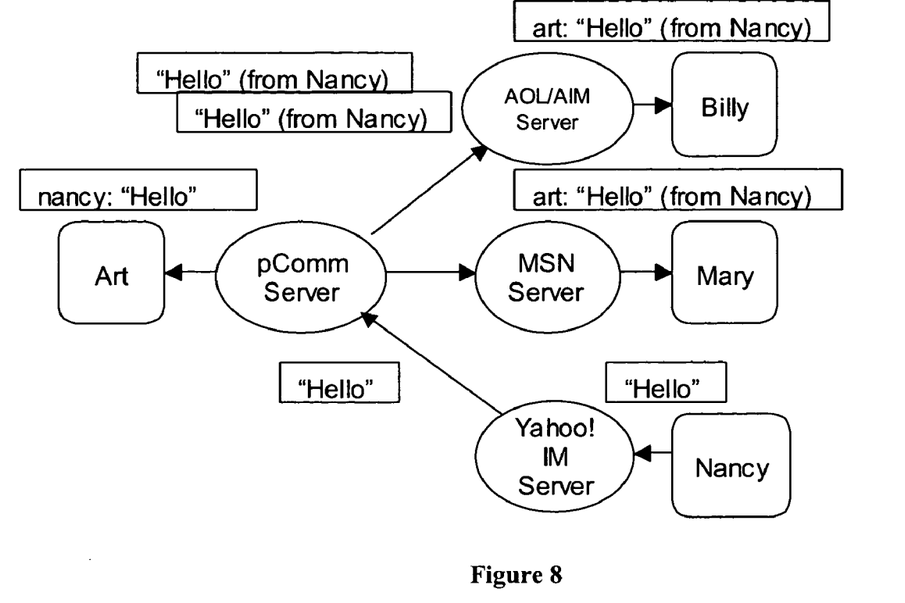

In the same manner, as shown in FIG. 7, Art may invite Mary and Nancy to the chat room through the pComm server by having the pComm server access the respective MSN and Yahoo servers. In FIG. 8, Nancy responds to the invitation by writing a message "Hello" back to Art. Significantly, this message is relayed by the pComm server to all conference (or virtual chat room) participants such that Nancy's "Hello" message is delivered to all user screens. This is possible by either loading the pComm server with Art's account (buddy list) information, or by allowing the pComm server to have access to Art's account information.

Figure 9:
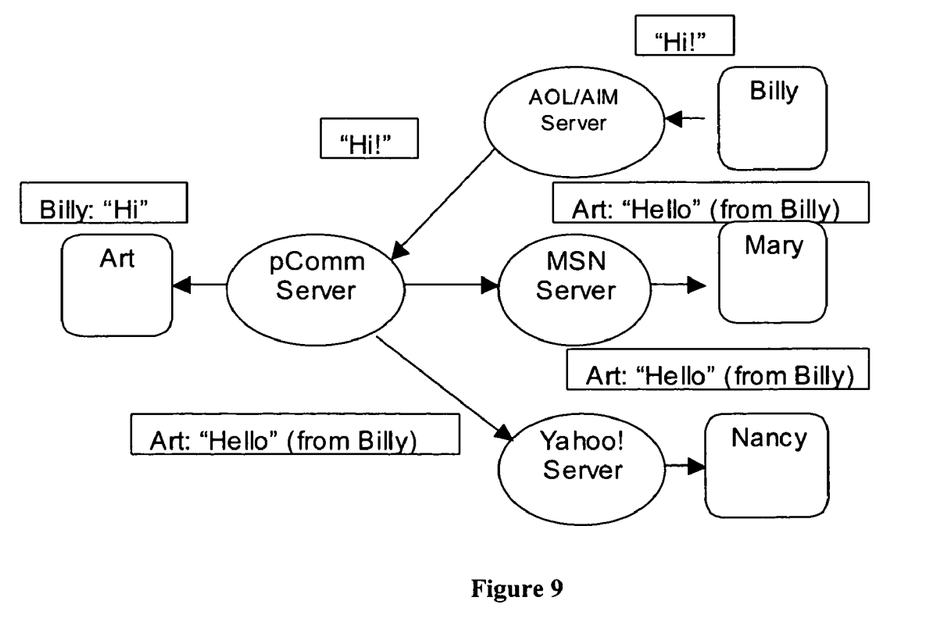

Finally, as shown in FIG. 9, Billy may respond to Nancy's message by writing a message "Hi". Similarly, this message is relayed by the pComm server and is delivered to all users via the pComm server and respective accounts. As will be appreciated by those skilled in the relevant art, all of the users can send messages following the same procedure once the conference is established.

It should be noted that it is not necessary for the above system to use the conferencing feature of a particular, or even any, Instant Messaging services. Instead, the pComm server can simply implement a propriety conference control that relays each message to all participants.

Furthermore, and in accordance with an aspect of this embodiment of the present invention, the relay message, e.g. "Art: 'Hello (from Nancy)'" may be rewritten in several different ways to indicate the source of the message. For example, the message from Art can be written as "Art: "Mary says: 'hello'". The source user may also be represented using a nick name (alias), "Mary" or a service dependent name, e.g., maryj32453@msn. The formatting may be controlled by the chat room owner.

Although described in the context of an IM environment, the instant embodiment of the present invention can also be implemented, at least partially, in an SMS (Short Messaging System) environment.

Combining Contacts

Another embodiment of the present invention further provides a method and system for combining contacts from disparate messaging networks.

It is often the case that users who employ multiple text messaging networks also have contacts (buddies) that do the same. However, such users may not be aware of a fellow contact's identity on other systems and, as such, may not be able to utilize features available on other networks to reach this user. To solve the problem, this embodiment of the present invention automatically identifies users of other presence and messaging networks that are also users of a local service and automatically updates the user's local buddy list to reflect this local membership. (Users may 'opt-in' or 'opt-out' to this feature.) With this embodiment of the present invention, two related users of ("buddies" on) AOL may not be logged-in with AOL but may, instead, be logged-in to Free World Dialup and will thus be able to connect via the common network.

Figure 10:
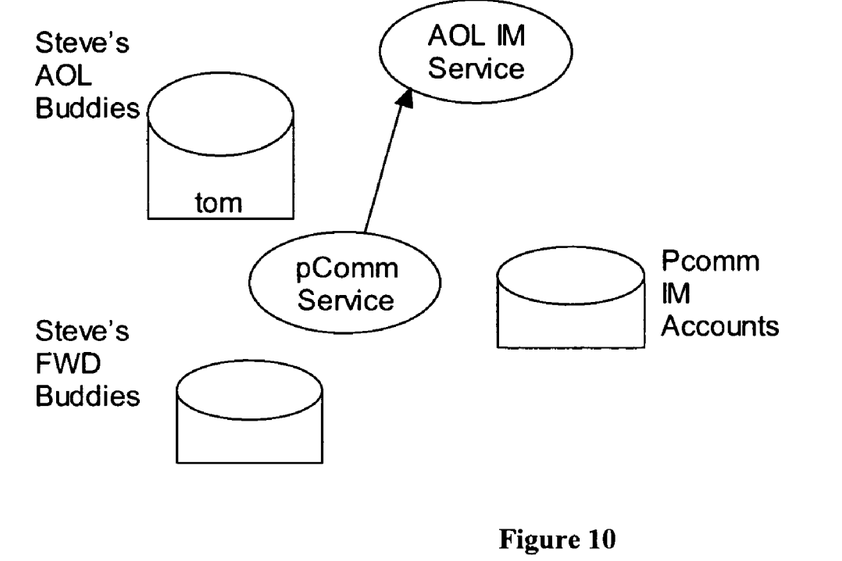
FIGS. 10-12 are diagrams showing an exemplary process for combining contacts from disparate messaging networks in accordance with embodiments of the present invention.
Figure 11:
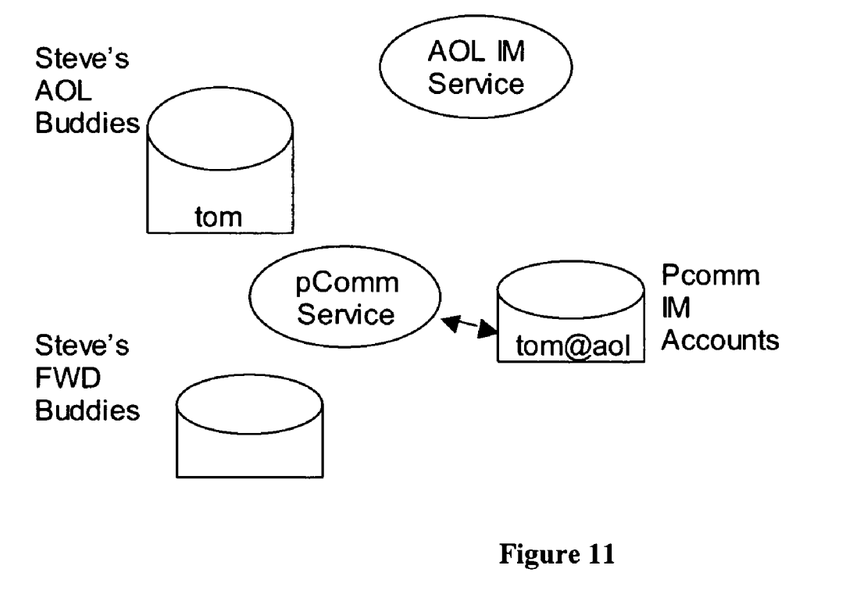
Figure 12:
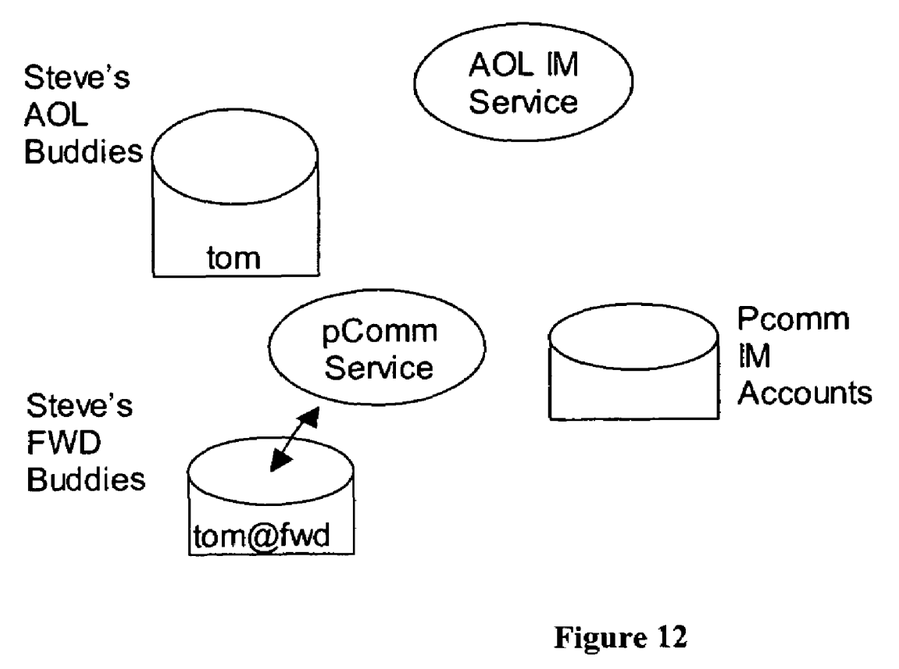

This embodiment is better explained with reference to FIGS. 10-12. As shown in FIG. 10, Steve logs-in to the pComm server from, e.g., a Free World Dialup server (i.e., local server) and the pComm server retrieves Steve's AOL buddy list that includes Tom. In FIG. 11, the pComm server determines that Steve's buddy, Tom, is also a Free World Dialup Member by scanning its own database. Consequently, and in accordance with this embodiment of the present invention as shown in FIG. 12, the pComm server automatically adds Tom's Free World Dialup contact information to Steve's Free World Dialup buddy list. As a result, Steve and Tom can send IM messages to each other using their respective Free World Dialup accounts.

It is noted that, in addition to adding Tom to Steve's one specific buddy list, the system of this embodiment of the present invention may also add Tom to any number of Steve's different IM systems' buddy lists.

Furthermore, the system can also be employed in the context of an SMS network environment wherein phone numbers may be associated with 'screen names' to create a unified messaging system.

In accordance with this embodiment of the present invention, once identified, users also do not need to be logged into the service where they were originally found to be reached.

This embodiment of the present invention also preferably provides a permission function to "unify accounts" that can be controlled in any one or more of several ways. For example, permission to unify an account may be granted only to members of one's buddy list, to specific contacts on the buddy list, to contacts within a preset 'degrees of separation' metric as described earlier, or to limited accounts.

Those skilled in the art will appreciate that the several embodiments of the present invention described herein provide enhanced control over and functionality for conventional communications methods, particular those involving IM. These controls and functions can be implemented using well-know programming and database management techniques that are well-within the skill of those skilled in the relevant art.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for providing a telecommunications service between a first instant messaging (IM) network operated by a first internet service provider and a second IM network operated by a second internet service provider, the first internet service provider being different from the second internet service provider, comprising:

provisioning an internet server that can establish communications with the first IM network and the second IM network;

receiving, at the internet server, a request from a first party to contact a second party and a third party via an IM session, wherein the second party subscribes to the first IM network and the third party subscribes to the second IM network;

accessing a database associated with the first party to identify the first IM network as the IM network to which the second party subscribes;

accessing the database to identify the second IM network as the IM network to which the third party subscribes; and establishing an independent IM session between the first party and the second party on the first IM network via the internet server, and an independent IM session between the first party and the third party on the second IM network via the internet server, such that any messages sent by any of the first, second or third parties can be received and seen by each of the first, second and third parties.

2. The method of claim 1, further comprising controlling the format of the any messages seen by the first, second and third parties.

3. The method of claim 1, wherein the database associated with the first party is provided at the internet server.

4. The method of claim 1, wherein the database associated with the first party is provided at a location associated with the first party.

5. The method of claim 1, wherein the first party subscribes to the first IM network and the second IM network.

6. The method of claim 1, wherein controlling the format of the any messages seen by the first, second and third parties comprises:

controlling the format of the any messages seen by the second and third parties by including a first identifier identifying the first party and a second identifier identifying a party that is a source of the messages, wherein the source is the second party or the third party.

7. A computer program product comprising a computer-readable medium storing computer-readable instructions, the computer-readable instructions being executable to enable a processor in an internet server to provide a telecommunications service between a first instant messaging (IM) network operated by a first internet service provider and a second IM network operated by a second internet service provider, the first internet service provider being different from the second internet service provider, the computer program adapted to cause the computer system to:

establish communications with the first IM network and the second IM network;

receive a request from a first party to contact a second party and a third party via an IM session, wherein the second party subscribes to the first IM network and the third party subscribes to the second IM network;

access a database associated with the first party to identify the first IM network as the IM network to which the second party subscribes;

access the database to identify the second IM network as the IM network to which the third party subscribes; and establish an independent IM session between the first party and the second party on the first IM network via the internet server, and an independent IM session between the first party and the third party on the second IM network via the internet server, such that any messages sent by any of the first, second or third parties can be received and seen by each of the first, second and third parties.

8. The computer program product of claim 7, wherein the computer program is further adapted to cause the computer system to control the format of the any messages seen by the first, second and third parties.

9. The computer program product of claim 8, wherein the computer program adapted to cause the computer system to control the format of the any messages seen by the first, second and third parties is further adapted to cause the computer system to:

control the format of the any messages seen by the second and third parties by including a first identifier identifying the first party and a second identifier identifying a party that is a source of the messages, wherein the source is the second party or the third party.

10. An internet server for providing a telecommunications service between a first instant messaging (IM) network operated by a first internet service provider and a second IM network operated by a second internet service provider, the first internet service provider being different from the second internet service provider, the internet server comprising one or more processors operable to:

establish communications with the first IM network and the second IM network;

receive a request from a first party to contact a second party and a third party via an IM session, wherein the second party subscribes to the first IM network and the third party subscribes to the second IM network;

access a database associated with the first party to identify the first IM network as the IM network to which the second party subscribes;

access the database to identify the second IM network as the IM network to which the third party subscribes; and establish an independent IM session between the first party and the second party on the first IM network via the internet server, and an independent IM session between the first party and the third party on the second IM network via the internet server, such that any messages sent by any of the first, second or third parties can be received and seen by each of the first, second and third parties.

11. The system of claim 10, wherein the database associated with the first party is provided at the internet server.

12. The method of claim 10, wherein the database associated with the first party is provided at a location associated with the first party.

13. The method of claim 10, wherein the first party subscribes to the first IM network and the second IM network.

* * * * *